United States Patent
Makridakis

(10) Patent No.: US 6,693,899 B1
(45) Date of Patent: Feb. 17, 2004

(54) SYSTEM AND METHOD FOR FACILITATING COMMUNICATION BETWEEN DISSIMILAR RADIO VOICE DEVICES

(75) Inventor: Kathy S. Makridakis, Cambridge, MA (US)

(73) Assignees: Verizon Corporate Services Group Inc., New York, NY (US); Genuity Inc., Woburn, MA (US)

(*) Notice: Subject to any disclaimer, the term of this patent is extended or adjusted under 35 U.S.C. 154(b) by 0 days.

(21) Appl. No.: 09/504,974

(22) Filed: Feb. 15, 2000

(51) Int. Cl.[7] ............................................... H04L 12/66
(52) U.S. Cl. ...................................... 370/356; 370/466
(58) Field of Search ................................ 370/352, 353, 370/354, 355, 356, 466

(56) References Cited

U.S. PATENT DOCUMENTS

| | | | |
|---|---|---|---|
| 5,291,479 A | 3/1994 | Vaziri et al. | |
| 5,297,231 A | 3/1994 | Miller | |
| 5,377,185 A | * 12/1994 | Bardusk | 370/352 |
| 5,646,983 A | 7/1997 | Suffern et al. | |
| 5,717,737 A | 2/1998 | Doviak et al. | |
| 6,141,341 A | * 10/2000 | Jones et al. | 370/352 |
| 6,345,047 B1 | * 2/2002 | Regnier | 370/352 |
| 6,392,999 B1 | * 5/2002 | Liu et al. | 370/260 |
| 6,434,139 B1 | * 8/2002 | Liu et al. | 370/352 |
| 6,542,504 B1 | * 4/2003 | Mahler et al. | 370/392 |

* cited by examiner

*Primary Examiner*—Chi Pham
*Assistant Examiner*—Keith M. George
(74) *Attorney, Agent, or Firm*—Leonard C. Suchyta, Esq.; Finnegan, Henderson et al.

(57) ABSTRACT

A method and an apparatus are disclosed for communicating between dissimilar radio voice communication devices across a wireless or wireline interface. The apparatus comprises a voice over Internet protocol (voIP) terminal connected to a computer network and an analog radio transceiver. The voIP terminal is comprised of at least one microprocessor for providing master control to a data acquisition (DAQ) board to create a system which is fully integrated in terms of the interface capability it provides to end users. In operation, the voIP terminal receives analog data from the analog radio transceiver, converts the data into a format recognizable by the computer network, and transmits the data to a desired location on the network. It also receives digital data from the computer network and transmits it into a format recognizable by the attached analog voice transceiver. The voIP terminal also provides the capability to alter its communication protocols to adapt to a plurality of different computer network protocols and radio transceivers.

11 Claims, 6 Drawing Sheets

SYSTEM AND METHOD FOR FACILITATING COMMUNICATION BETWEEN DISSIMILAR RADIO VOICE DEVICES

STATEMENT REGARDING FEDERALLY SPONSORED RESEARCH OR DEVELOPMENT

This invention was made with Government support under Contract No. MDA972-98-C-0012, awarded by DARPA. The Government has certain rights in this invention.

FIELD OF THE INVENTION

The present invention relates to a system and method for transporting data between dissimilar communications media. More particularly, the present invention relates to an apparatus and method for transporting data between dissimilar analog radio devices over a computer network.

DESCRIPTION OF THE PRIOR ART

Wireless data communication techniques and systems have been generally available for many years. Implementations exist which employ microwave communication systems and/or radio-frequency (RF) communication systems. Amplitude-modulated (AM) radio communications and frequency-modulated (FM) radio communications are examples of RF implementations. FM communication techniques include both conventional point-to-point radio and trunked radio that are utilized for transporting data.

Generally, the wireless RF implementations have an incompatibility with both each other and other standard wired networks. That is, FM communication devices and AM communication devices cannot communicate directly with one another, nor can RF communication devices communicate directly with microwave devices. Moreover, each wireless RF implementation has its own data communications protocol for interacting with other RF devices and another, possibly different protocol for interacting with wired networks.

In the past, telecommunications systems have been developed which provide distributed processing for voice and data transmitted by a variety of telecommunications devices. The systems, however, generally must employ identical, or at least compatible telecommunications devices in order to provide many of their telecommunications services. The systems are therefore not fully integrated telecommunications systems. An additional drawback associated with many existing telecommunications systems relates to the lack of modularity of the hardware and software components in the system, making changes in subscriber services and in the number of ports supported by the system uneconomical.

In the last few years, the Internet has evolved into the largest and most agile computer communication network in the world. It permits a vast assortment of geographically dispersed computers, printers, fax machines, etc. to communicate together using a single interface protocol. Internet users can now share information and computing power with any other Internet user by simply logging onto the network. The obvious advantages of the communication capabilities provided by the Internet has thus far not expanded to include radio voice communication devices.

There is a need therefore for an improved apparatus and method for providing wireless or wireline communication among dissimilar radio voice communication devices that provides the capability for any radio voice communication device to communicate with any other voice communication device over a wireless or wireline interface.

SUMMARY OF THE INVENTION

Systems and methods consistent with this invention enable communication between dissimilar radio voice communication devices across a wireless or wireline interface. A system consistent with the present invention comprises a voice over Internet protocol (voIP) terminal configured to communicate over a computer network. An analog radio transceiver is coupled to the voIP terminal which is further comprised of at least one microprocessor for providing master control to a data acquisition (DAQ) board to create a system that is fully integrated in terms of the interface capability it provides to end users. In operation, the voIP terminal receives analog data from its associated analog radio transceiver, converts the data into a format recognizable by the computer network, and transmits the data to a desired location on the network. It also receives digital data from the computer network and transmits it into a format recognizable by the attached analog voice transceiver. The voIP terminal further provides the capability to alter its communication protocols to adapt to a plurality of different computer network protocols and radio transceivers.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention. In the drawings.

DETAILED DESCRIPTION

Figure 1:
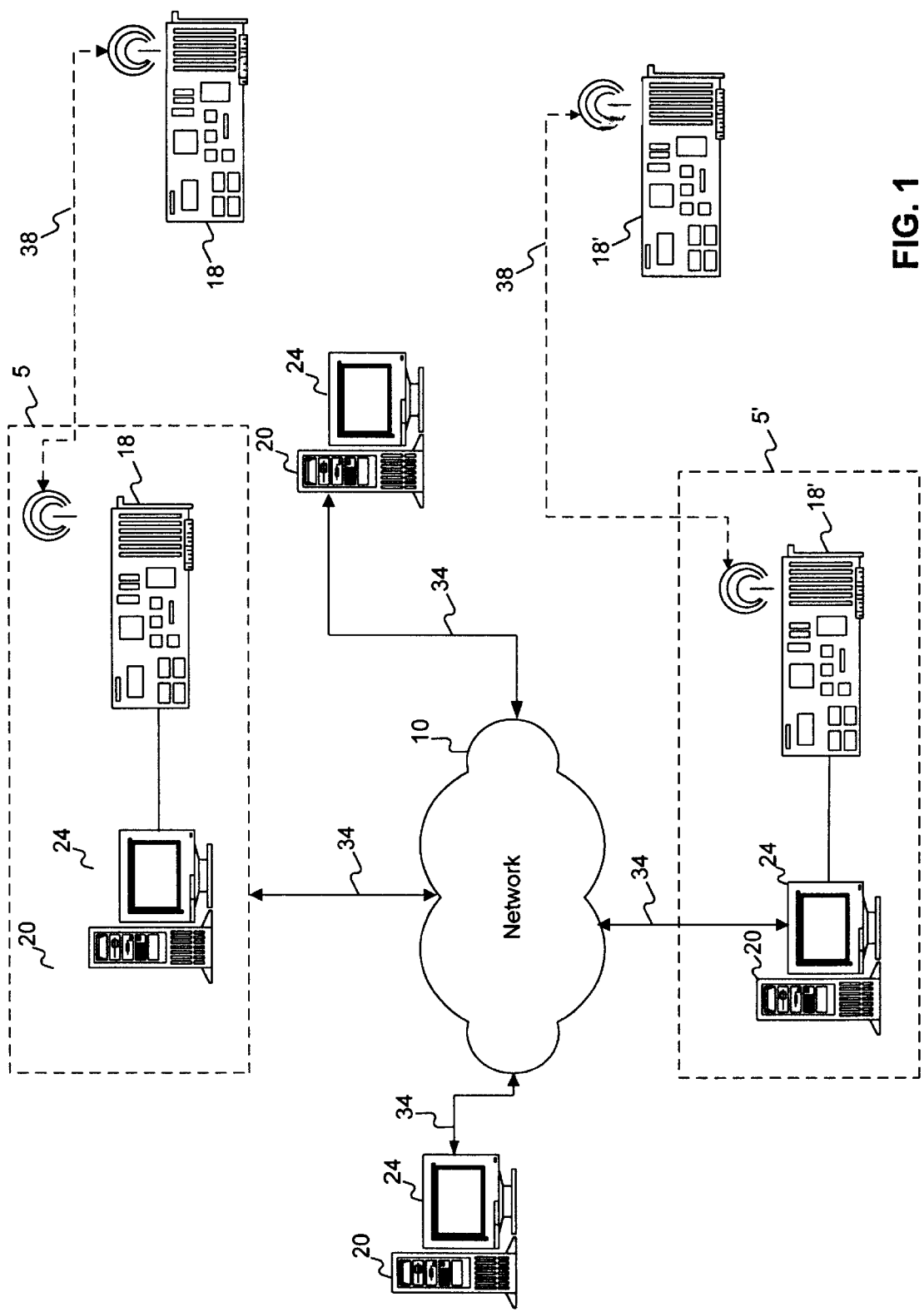
FIG. 1 is a block diagram of a network including an arrangement constructed in accordance with the subject invention for providing communication across dissimilar radio voice communication devices.

In the following detailed description of the preferred embodiment, reference is made to the accompanying drawings that form a part thereof, and in which is shown by way of illustration a specific embodiment in which the invention may be practiced. This embodiment is described in sufficient detail to enable those skilled in the art to practice the invention and it is to be understood that other embodiments may be utilized and that structural changes may be made without departing from the scope of the present invention. The following detailed description is, therefore, not to be taken in a limited sense.

A system in accordance with the present invention, comprises a voice over Internet protocol (voIP) terminal configured to communicate over a computer network. An analog radio transceiver is coupled to the voIP terminal which is further comprised of at least one microprocessor for providing master control to a data acquisition (DAQ) board to create a system that is fully integrated in terms of the interface capability it provides to end users. The voIP terminal receives analog data from its associated analog radio transceiver, converts the data into a format recognizable by the computer network, and transmits the data to a desired location on the network. It also receives digital data from the computer network and transmits it into a format recognizable by the attached analog voice transceiver. The voIP terminal further provides the capability to alter its communication protocols to adapt to a plurality of different computer network protocols and radio transceivers.

Turning first to the nomenclature of the specification, the detailed description which follows is represented largely in terms of processes and symbolic representations of operations performed by conventional computer components, including a central processing unit (CPU), memory storage devices for the CPU, and connected pixel-oriented display devices. These operations include the manipulation of data bits by the CPU and the maintenance of these bits within data structures reside in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, objects, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. It must be understood that no such involvement of a human operator is necessary or even desirable in the present invention. The operations described herein are machine operations performed in conjunction with a human operator or user who interacts with the computer. The machines used for performing the operation of the present invention include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

The operating environment in which the present invention is used encompasses general distributed computing systems wherein general purpose computers, work stations, or personal computers are connected via communication links of various types. In a client server arrangement, programs and data, many in the form of objects, are made available by various members of the system.

Referring now to the drawings, in which like numerals represent like elements throughout the several figures, the present invention will be described.

Referring first to FIG. 1, a communication network 10, is comprised of a plurality of network computers 20 and analog radio transceivers 18 and 18'. Analog radio transceivers 18 and 18' represent dissimilar radio transceivers that cannot communicate directly with each other, without a format data conversion. That is, analog radio transceiver 18 can communicate with another analog radio transceiver 18, but it cannot directly communicate with analog radio transceiver 18' unless the output of radio transceivers 18 and 18' are modified such that they are compatible with each other. Communication network 10 may also include a plurality of voice over IP (voIP) terminals 5 and 5', comprising a host computer 20 with a display 24, coupled to an analog radio transceiver 18. In addition to the display 24, network computers 20 may include an input/output device (not shown in this FIG.) and printer (not shown), and reside at a plurality of dispersed locations. Each voIP terminal 5 and 5' acts as a protocol-agile communications controller for interfacing with an attached analog radio transceiver 18 and 18' and for sending and receiving data to and from the communications network 10. The communication network 10 may be, for example, a Token ring network, an Ethernet Local Area Network (LAN) or a wide area network (WAN). For purposes of illustration, only two voIP terminals 5 and 5', two standalone network computers 20, and two stand-alone transceivers 18 are shown in FIG. 1. However, as is known by those skilled in the art, any number of voIP terminals, standalone computers, and standalone transceivers may populate a typical computer network 10.

Each voIP terminal 5 and 5' communicates with network 10 via a wireless or wire line interface 34. Standalone analog radio transceivers 18 and 18' communicate with other similar standalone analog radio transceivers via RF communication link 38, and they may communicate with dissimilar analog radio transceivers over network 10 via a voIP terminal 5 and 5'. In accordance with an aspect of the present invention, the host computer 20 associated with voIP terminal 5 and 5' receives analog data from the attached analog radio transceiver 18 and 18', converts it into digital data and transmits the digital data to network 10.

The interface capability provided by the voIP terminal 5 and 5' permits a user operating an attached radio transceiver to seamlessly communicate with a plurality of similar analog radio transceivers through via RF communication link 38, and simultaneously communicate with dissimilar radio transceivers over network 10. In accordance with an aspect of the invention, the voIP terminal 5 and 5' receives data transmitted by the attached radio transceiver 18 and 18', irrespective of the protocol of the transceiver, and converts the data into a format protocol recognized by network 10. Network 10 transports the data to its intended location and then outputs the data to a remote voIP terminal where the data is converted for playback to a format compatible with the analog transceiver coupled to the remote voIP terminal 5 and 5'. Accordingly, the user of voIP terminal 5 and 5' does not have to perform any additional steps to send and receive data to and from the communication network 10, or any other radio transceiver. Nor does the communication network 10 have to perform any additional steps to send and receive data to and from voIP terminal 5 and 5'. The user of the voIP terminal 5 and 5' interacts with the communication network 10 in a manner similar to a user of a simple host computer 20. Likewise, the communication network 10 interacts with the voIP terminal 5 and 5' in a similar manner as the communication network interacts with the simple host computer 20.

The communication capability of voIP terminal 5 and 5' may be implemented through a collection of software program modules and hardware components working cooperatively. The system itself may run on a standard platform, such as a personal computer (PC) equipped with a commercially available processor or multi-processor, e.g., an Intel or Motorola based processor or multi-processor, and a commercially available operating system, such as an MS-DOS or UNIX based operating system. The voIP terminal 5 and 5' may also contain an Ethernet controller or suitable network controller card depending on the communication network 10.

Figure 2:
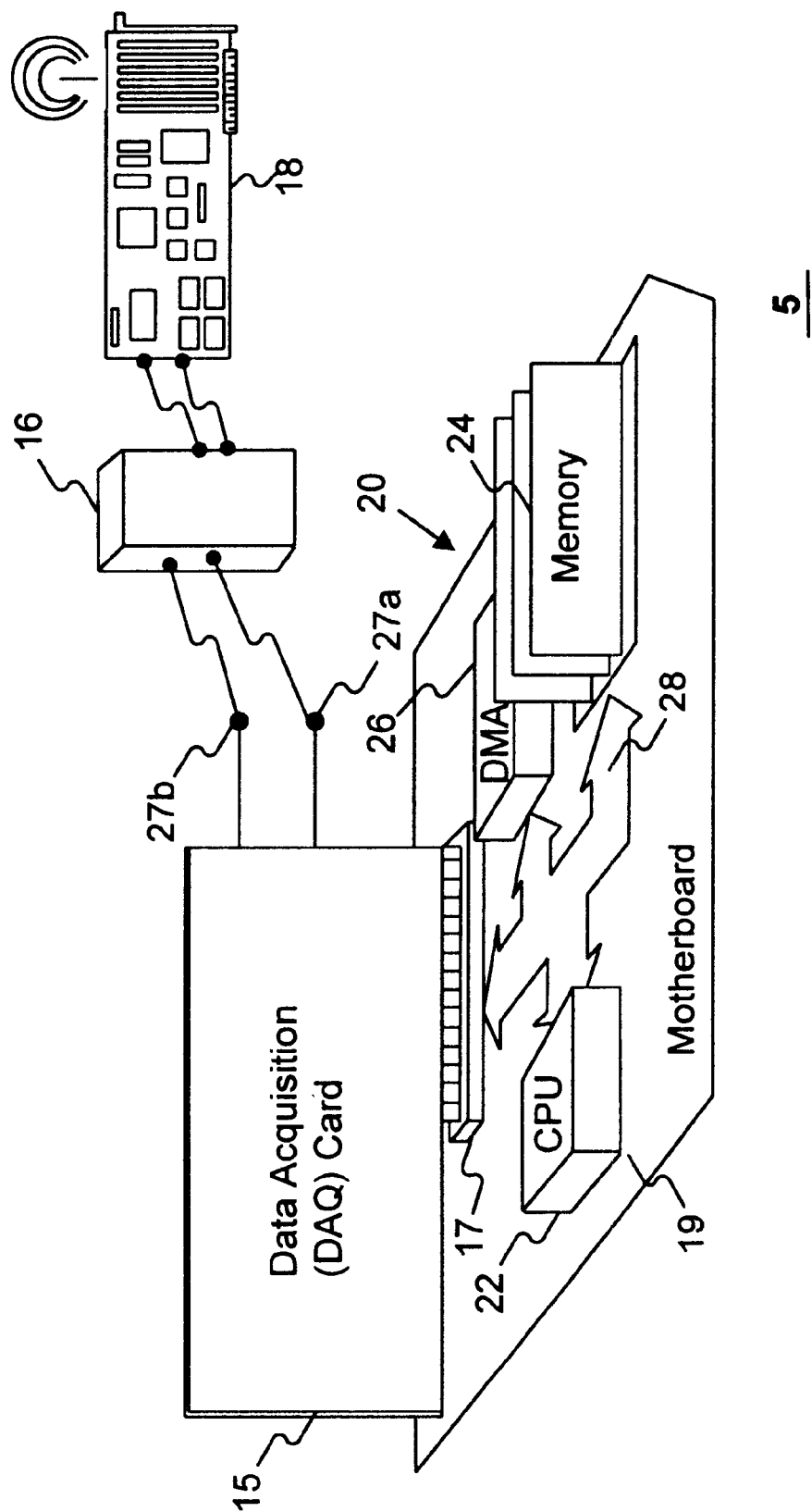
FIG. 2 is a block diagram of the major components of a voIP terminal.

Referring now to FIG. 2, there is illustrated a detailed block diagram of the basic components of a voIP terminal 5 and 5'. As shown in FIG. 2, voIP terminal 5 and 5' consists of components mounted on an digital acquisition (DAQ) board 15 which plugs into an available socket 17 on the motherboard 19 of a conventional IBM-compatible Personal Computer indicated generally at 20. The host computer 20 includes a conventional single-chip integrated microprocessor (CPU) 22 which executes programs stored in a RAM memory unit 24 which is depicted in FIG. 2 as a group of single inline memory module (SIMM) devices 24 mounted on the motherboard 19. The RAM memory 24 is typically loaded with programs to be executed by the CPU 22 from their permanent storage location on a magnetic disk drive (not shown).

The host computer 20 includes an internal system bus 28 which interconnects the CPU 22, the random access memory (RAM) 24, the direct memory access (DMA) 26 and the DAQ card 15 via the expansion socket 17. As seen in both FIGS. 2 and 3, the DAQ card 15 is provided with standard interface jacks 27a and 27b through which a connection is made to a conventional screw terminal 16, which is then connected to an analog radio transceiver 18. While this explanation may illustrate a single analog radio transceiver 18 coupled to a voIP terminal 5 and 5', several analog radio sources may be coupled to each voIP terminal 5 and 5' via conventional screw terminal 16. DAQ card 15 takes the form of a standard adapter card which plugs into an available expansion slot 17 on the host computer 20 to connect to the host computer's internal bus 28.

The DAQ card 15 sends/receives analog signals via screw terminal 16 to/from analog radio transceiver 18. Two standard interface jacks (not show) may be used to provide convenient external connections to screw terminal 16, one jack accepting a plug from the input (receive) terminal of radio transceiver 18 and one jack from the output (transmit) terminal.

Figure 3:
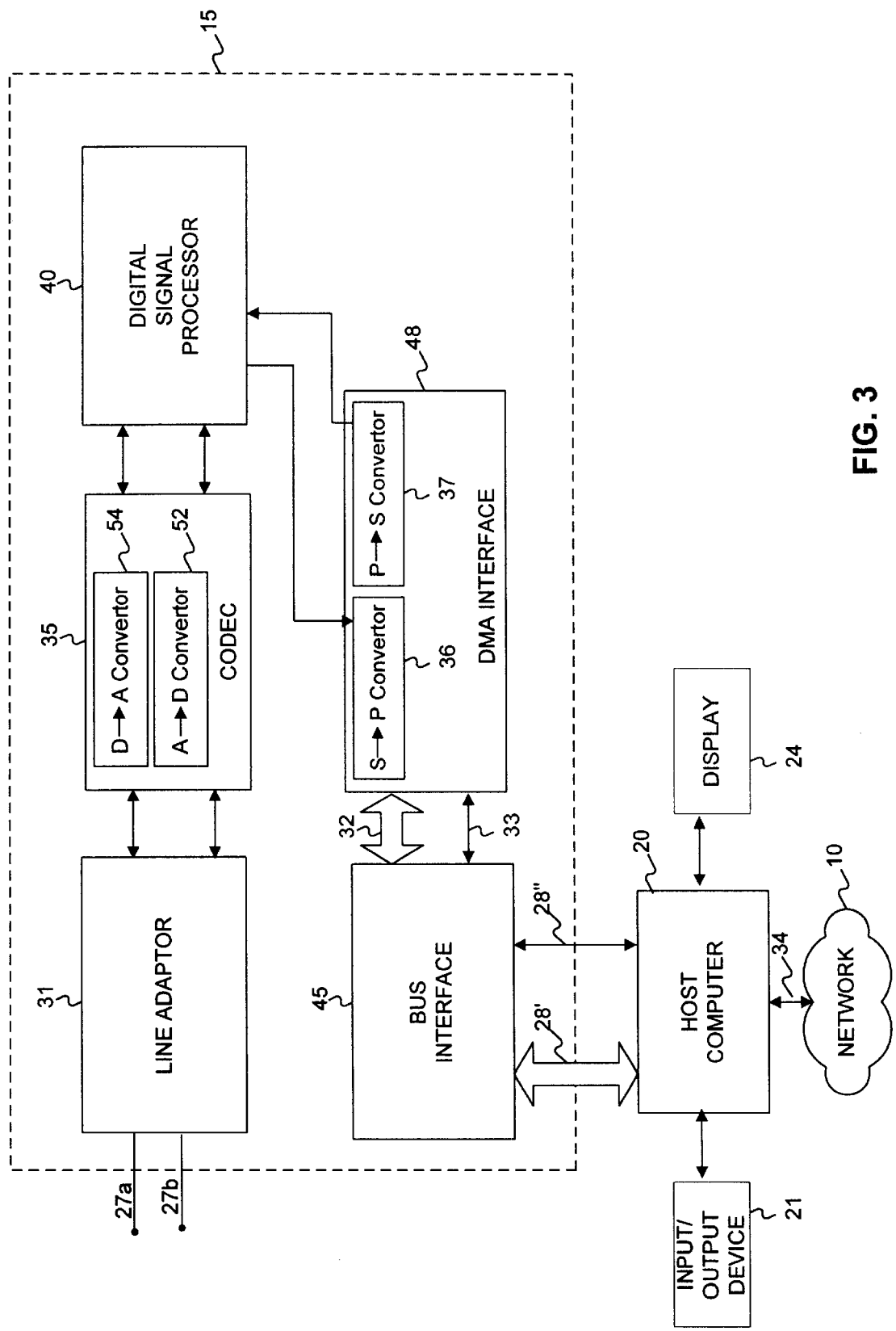
FIG. 3 is a more detailed block diagram of the voIP terminal of FIGS. 1 and 2.

As shown in FIG. 3, the DAQ card 15 includes input line adaptor terminal 27a, output line adaptor terminal 27b, line adaptor circuit 31, audio coder/decoder (CODEC) circuit 35, a digital signal processor (DSP) 40, bus interface circuitry 45, and a DMA interface 48. CODEC circuit 35, as shown in FIG. 3 is further comprised of a digital-to-analog (D→A) convertor 54 and an analog-to-digital (A→D) convertor 52. DMA interface 48 is further comprised of a parallel-serial (P→S) convertor 37 and a serial-to-parallel (S→P) convertor 36. Line adaptor 31 interconnects the analog radio transceiver 18 (FIG. 2) via the screw terminal 16 with CODEC 35. CODEC 35 splits the analog voice-band signal into inbound and outbound components. It converts incoming audio analog data from radio transceiver 18 into digital data, and it converts outgoing digital signals from DSP 40 into analog signals. DSP 40 samples received voice-band signals, encodes the sample amplitudes into digitally-expressed values, and sends these values via DMA interface 48 and bus interface circuitry 45 (FIG. 3) to the host computer 20. As described in more detail below, the conventional processor within the host computer 20 processes incoming digitally-expressed sample values to perform one of a variety of functions, depending on the nature of the incoming signal.

In addition to receiving and transmitting digital audio data, DSP 40 similarly receives and transmits radio transmission status information. More specifically, DSP 40 receives a carrier detect signal from analog transceiver 18 when the push-to-talk (PTT) control for transceiver 18 is enabled. DSP 40 also receives a carrier detect signal from, and transmits a carrier detect signal to computer network 10 via serial links 28" and 33 in turn, when a transmission signal is communicated over network 10. DSP 40 correspondingly transmits a PTT signal to analog transceiver 18 concurrently with processed voice samples from network 10.

While this specification describes the use of transmission control protocol/Internet protocol (TCP/IP) and user datagram protocol/Internet protocol (UDP/IP) packet transport mechanisms, those skilled in the art will recognize that any protocol (H323, HTTP, etc.) that provides efficient data transportation, whereby the transmission of analog radio transceiver data and digital network data is transparent or invisible to the user may be utilized. The voIP terminal 5 and 5' accepts the protocol data from an associated analog transceiver 18 and encapsulates it into the appropriate protocol used by the communication network 10. The data is passed to the communication network 10 in a similar fashion for passing data from any of the other network computers 20. Similarly, outbound data to the analog radio transceiver 18 from the communication network 10 is removed from the network protocol by the voIP terminal 5 and 5'. The voIP terminal 5 and 5' then encapsulates the data into the appropriate protocol associated with the attached analog radio transceiver 18 and 18', and outputs the data to the transceiver.

The processing of an incoming voice-grade signal in the DAQ card 15 is shown in more detail in FIG. 3. The incoming voice-band signal arriving at line adapter terminals 27 seen in FIG. 3 may be a conventional radio voice signal, or some other signal capable of being transmitted over a conventional analog transmission medium. Processing inbound data from the analog radio transceiver 18 to the network 10 begins when input analog data is converted into audio signals by analog audio transceiver 18 and transmitted through screw terminal 16 to line adapter terminal 27a. The analog audio transceiver 18 may be a field radio or other device which converts detected sounds into analog audio signals. Analog audio signals provided to the line adapter terminal 27a are transmitted to line adapter 31 and then to the CODEC 35 for conversion into serial digital audio data by A→D converter 52. As shown in FIG. 3, CODEC 35 provides an interface for a two-way exchange of audio signals between host computer 20 and analog radio transceiver 18. More specifically, CODEC 35, which includes an A→D converter 52 and a D→A converter 54, is configured to permit two types of audio signal transfer operations: analog audio transfer operations whereby analog audio signals originating at the analog radio transceiver 18 are converted to serial digital signals and then transferred to the DMA interface 48, and digital signal transfer operations whereby digital audio signals are converted to analog signals and then transferred to the analog audio output, which in this case is the analog radio transceiver 18.

The serial digital audio data produced by the A→D converter 52 is then transmitted to DSP 40 that processes the serial digital data by compressing the received data in accordance with a preselected compression algorithm, and routes the processed serial digital data to the S→P converter 36 located in DMA interface 48. S→P converter 36 converts the serial digital data into parallel digital audio data. The resultant processed parallel digital audio data is output by the DMA interface 48 to the bus interface 45 via parallel data bus 32. There, the processed parallel digital audio data is transferred to host computer 20 via parallel data bus 28' and then to network 10 at which time the data may be transferred to any destination for storage, audio playback or other operations. Parallel data buses 28' and 32 are capable of simultaneously transferring multiple digital audio data bits, for example, 8 data bits from one location to another. As shown in FIG. 3, data buses 28' and 32 are depicted as wide arrows to accurately characterize the parallel nature of the data traveling thereon. Serial data buses 28" and 33 are correspondingly depicted as solid arrows to accurately characterize the nature of the serial data traveling thereon.

Transporting outbound data from the network 10 to an analog radio transceiver 18 begins when parallel digital audio signals are transmitted from network 10 to host computer 20 and then to bus interface 45 via parallel data bus 28'. Digital audio signals may, for example, be transferred to host computer 20 by another VoIP terminal 5 and 5', and then communicated to a remote voIP terminal 5 and 5' in real time, or the digital signals may be stored somewhere on network 10 and then later output to a voIP terminal 5 and 5'. Once received by host computer 20, the parallel digital audio signals are processed by CPU 22, directed to bus interface 45 via parallel data bus 28' and then on to DMA interface 48 via parallel link 32. Operation of host computer will be further explained below with respect to FIG. 5. The parallel digital audio data transferred to DMA interface 48 is then converted from a parallel format to a serial format by P→S converter 37. The serial digital audio data produced is then transferred to DSP 40 where the data is decompressed (or "expanded"). Typically, the digital audio data is compressed by a computer system in order to minimize storage requirements and maximize the speed at which data transfers can occur over the network. However, compressed data cannot be converted into discernable audio by conventional audio transceivers. DSP 40 processes the digital audio data, by expanding the compressed digital audio data, and transferring it to the D→A converter 54. The D→A converter 54 converts the processed serial digital audio data into analog format and transmits the analog audio data produced to the line adaptor 31, then to interface jack 27b, and finally onto analog radio transceiver 18.

Figure 4:
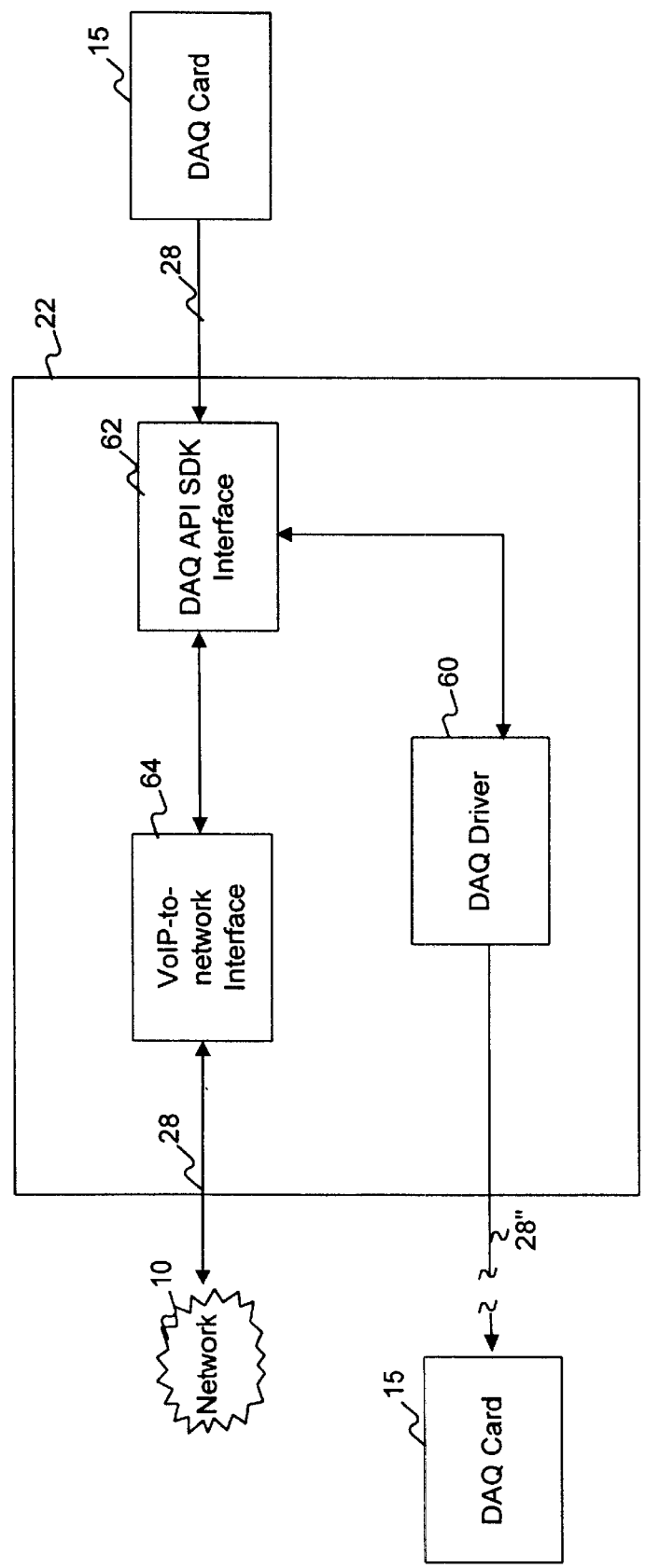
FIG. 4 a more detailed block diagram of the central processing unit 22 of FIG. 2.

As shown in FIG. 4, software operating on CPU 22 may comprise a DAQ Driver 60, a DAQ application programming interface (API) software development kit (SDK) interface 62, and a VoIP-to-Network Interface 64. The VoIP-to-Network Interface 64 maintains a list of voIP terminals 5 and 5' to which the CPU 22 can communicate, and is responsible for sending data to, and receiving data from network 10. It communicates with network 10 via system bus 28 over a network interface which may be comprised of an RS-232 adaptor.

The DAQ API SDK interface 62 is specific to the type of the connected analog radio transceiver 18 connected. Software parameters, such as the number of subsystem ports, and how often to send health and status requests may be set and stored in the DAQ API SDK interface 62. It receives processed parallel audio data and a serial carrier detect signal from DAQ board 15 and transmits the data to network 10 for reception by a voIP terminal 5 and 5' located elsewhere on the network. It also receives processed parallel audio data and a serial carrier detect signal from network 10, transmits the data to DAQ board 15 and eventually onto analog radio transceiver 18 and 18'.

The DAQ driver 60 is responsible for sending and receiving the data to the DAQ card 15 and then to the associated radio transceiver 18 and 18'. The DAQ driver 60 communicates with DAQ card 15 via system bus 28. Because the CPU 22 is designed to integrate dissimilar radio analog protocols, each CPU 22 may be software configured, for purposes of flexibility, to work with many types of radio analog transceivers 18 and 18'.

Figure 5:
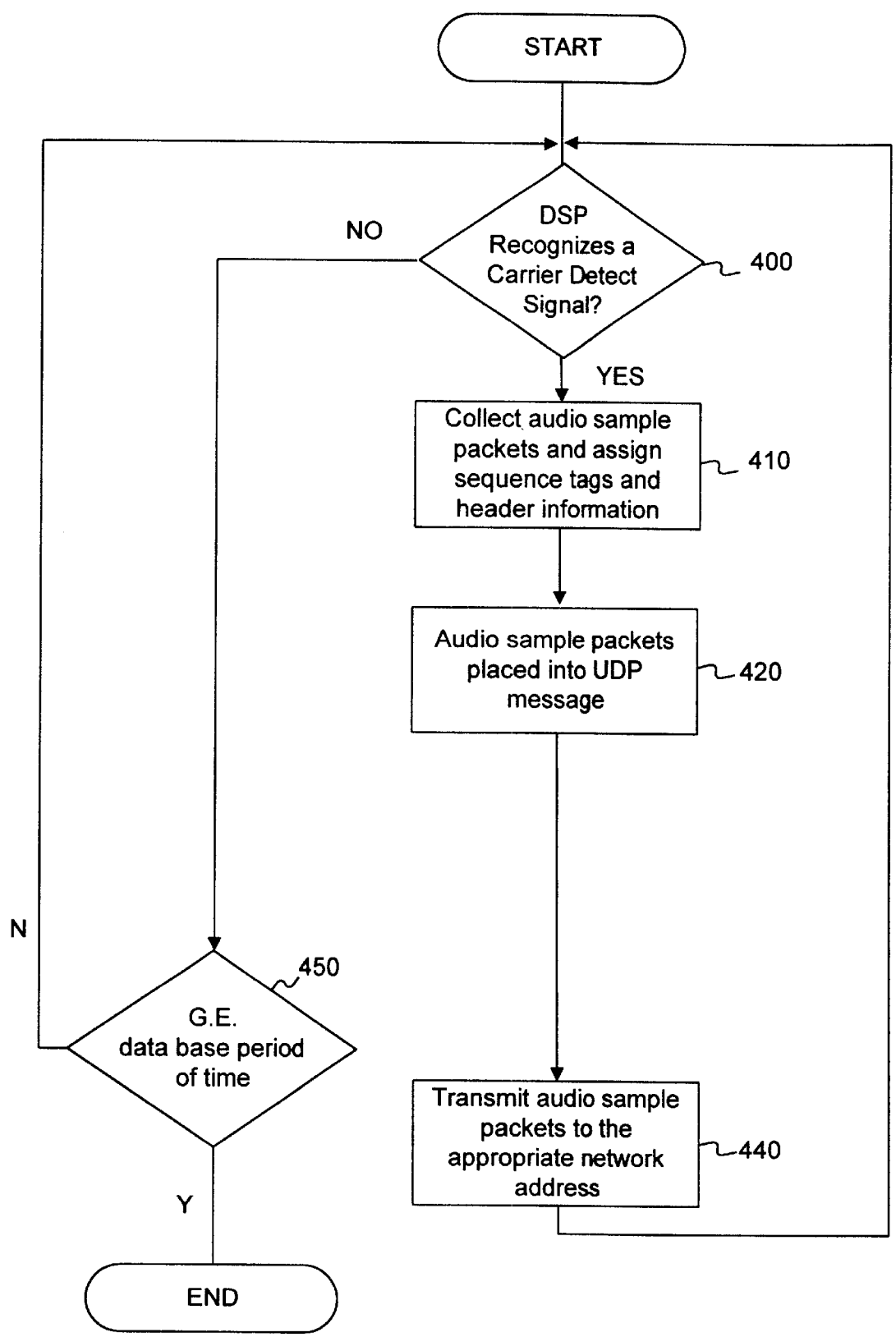
FIG. 5 is a flow chart showing the operation of the voIP terminal when communicating with a computer network.

Referring now to FIG. 5, there is illustrated a detailed flow chart of the set of procedures associated with the voIP terminal for communicating seamlessly with network 10. When the DSP 40 recognizes a carrier detect signal (step 400), a process is started which collects audio sample packets (step 410) and continues to run as long as the carrier detect signal is present on a specific channel. These audio sample packets are also assigned sequence tags and header information. In step 420, the audio sample packets are placed into a user datagram protocol (UDP) message for transmission to network 10 and in step 440, audio sample packets are sent to the appropriate network address as identified in the header information. Since each packet stores its own header information, audio sample packets from multiple audio sources may be placed in the same UDP message. Each message may be comprised of a variable number of packets, with each packet consisting of compressed voice samples. The UDP message is sent to the host computer 20 through the bus 45 and DMA interfaces 48. This process continues as long as DSP 40 recognizes a carrier detect signal. If DSP 40 does not receive a carrier detect signal for greater than a database period of time (step 450), the process terminates.

At the receiving voIP terminal 5 and 5', host computer 20 strips off the header information and transmits the UDP messages with the associated carrier detect signal to DSP 40, where audio sample packets destined for playback are buffered for an automatically determined delay period by an adaptive buffering algorithm programmed into the DSP. Conventional statistical methods are used to determine the degree of uncertainty in packet delivery time and adjust packet buffering to minimize gaps in the playback due to any non-deterministic delivery times that might develop in the LAN/WAN caused by variations in throughput of network data. The sequenced tags are used to place the packets in the correct playback order, and the packets are sent to the D→A converter in the CODEC 35 at a rate that matches the packet input rate at the sending DSP 40. The analog signals are output through the line adaptor 31, to interface jack 27b, to the screw terminal 16 and then to the analog radio transceiver 18.

Figure 6:
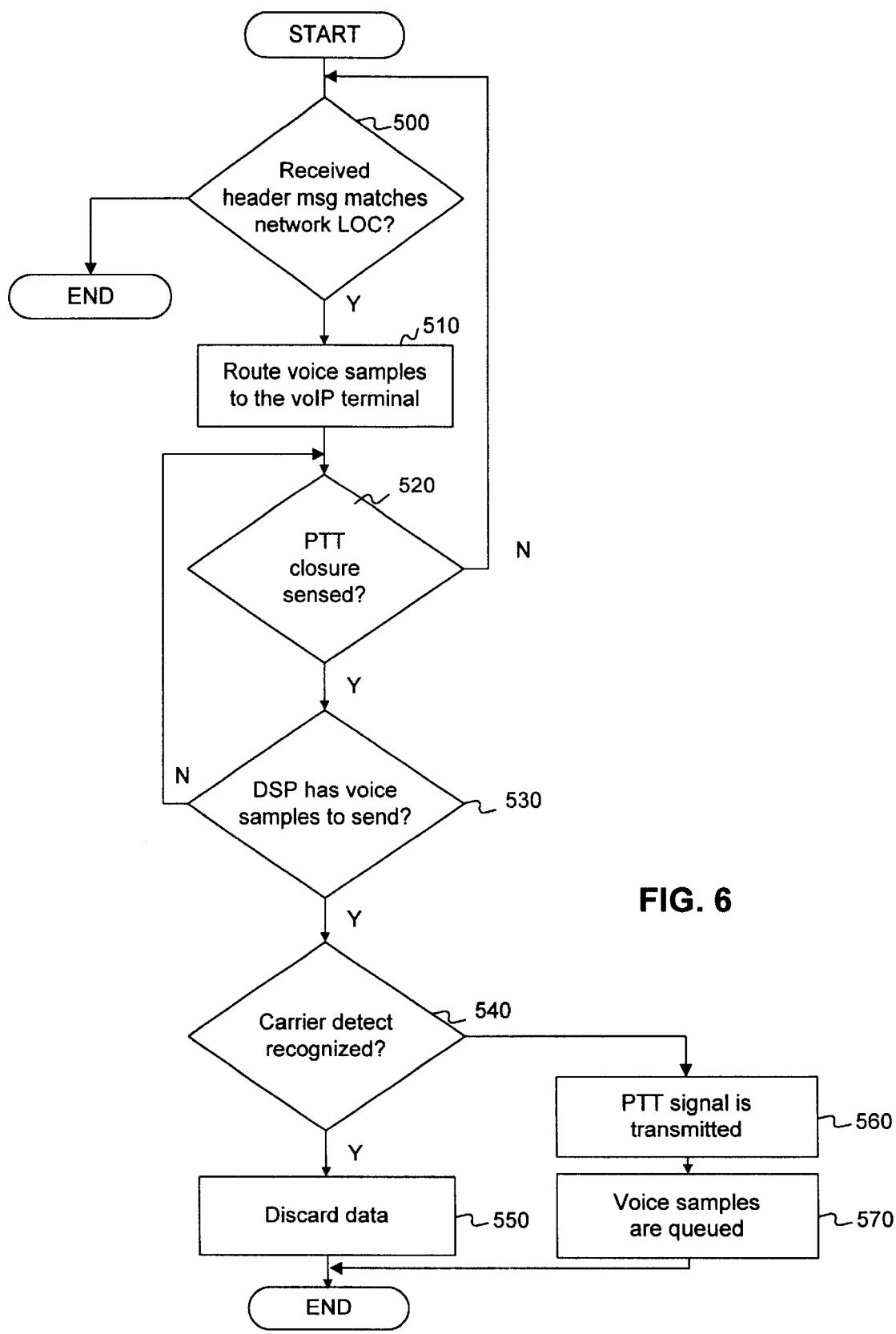
FIG. 6 is a flow chart showing the operation of the voIP terminal when communicating with an analog radio device.

Referring now to FIG. 6, there is illustrated a detailed flow chart of the set of procedures associated with the voIP terminal 5 and 5' for communicating with an associated analog radio transceiver 18 and 18'. Whenever the header information in a UDP message packet matches a network location assigned to a voIP terminal 5 and 5' (step 500), voice samples are routed to the voIP terminal (step 510) by a network controller (not shown). As previously stated, voice samples may be transported in real time from one voIP terminal 5 and 5' to another, or the voice samples may be stored on the network and read out later. In the case of a real time transmission, push-to-talk (PTT) control is initiated at an analog radio transceiver 18 by pressing the PTT switch attached to the analog radio transceiver (not shown). PTT switch closure is simulated by computer 20 when the voice samples are read from memory. When PTT switch closure is sensed by DSP 40 (step 520), it activates the voice distribution process operating in CPU 22. If the DSP 40 determines it has voice samples to send (step 530), it next tests to determine whether the attached analog transceiver is transmitting data (step 540). Since analog radio transceivers 18 cannot transmit and receive voice samples simultaneously, before transmitting data to an associated analog radio transceiver, DSP 40 ascertains whether the analog radio transceiver 18 is transmitting data by determining whether it recognizes a carrier detect from the transceiver 18 (step 540). If it recognizes a carrier detect signal, the voice samples received from network 10 are discarded in step 550. If DSP 40 determines that analog transceiver 18 and 18' is not transmitting data, it sends the received digital signals through the D→A converter in the CODEC 35, generates a PTT signal (step 560), and the voice samples are queued for playback in step 570.

In addition to conveying audio data from radio transceiver 18 to network 10 and vice versa, software operating on CPU 22 (shown in FIG. 2) is also capable of transforming received data from one format to another. The microprocessor software may specifically be designed to transform received digital data from an incompatible protocol to a protocol compatible with the analog radio transceiver associated with the host computer 20. In accordance with the present invention, the voIP terminal 5 and 5' may be implemented by any combination of hardware and software. For example, the voIP terminal 5 and 5' may comprise a commercially available processor with overlying software and random access memory. The software running in the voIP terminal 5 and 5' may be written in C/C++, Z80 or other appropriate processor-based (i.e., native) assembly language and configured to the associated radio transceiver 18. The software may specify the various voltage levels and logic signals necessary to communicate via with the transceiver 18 over the RF communications medium. As noted above, the voIP terminal 5 and 5' may translate and pass any protocols associated with the communications network 10 to and from the radio transceiver 18 to make it appear that the associated transceiver is communicating with a similar transceiver. Configuration information may be input through the input/output device (FIG. 3) and passed over the system bus 28 to the CPU 22, which allows parameters such as packet size to be easily changed at the voIP terminal 5 and 5'.

From the foregoing description, it will be appreciated that the present invention provides an efficient system and method for reading package information. The present invention has been described in relation to particular embodiments which are intended in all respects to be illustrative rather than restrictive. Those skilled in the art will appreciate that many different combinations of hardware will be suitable for practicing the present invention. Many commercially available substitutes, each having somewhat different cost and performance characteristics, exist for each of the components described above.

Although aspects of the present invention are described as being stored in memory, one skilled in the art will appreciate that these aspects can also be stored on or read from other types of computer-readable media, such as secondary storage devices, like hard disks, floppy disks, or CD-ROMs; a carrier wave from the Internet; or other forms of RAM or ROM. Similarly, the method of the present invention may conveniently be implemented in program modules that are based upon the flow charts in FIGS. 5–9. No particular programming language has been indicated for carrying out the various procedures described above because it is considered that the operations, steps and procedures described above and illustrated in the accompanying drawings are sufficiently disclosed to permit one of ordinary skill in the art to practice the instant invention. Moreover, there are many computers and operating systems which may be used in practicing the instant invention and therefore no detailed computer program could be provided which would be applicable to these many different systems. Each user of a particular computer will be aware of the language and tools which are most useful for that user's needs and purposes.

Alternative embodiments will become apparent to those skilled in the art to which the present invention pertains without departing from its spirit and scope. Accordingly, the scope of the present invention is defined by the appended claims rather than the foregoing description.

What is claimed is:

1. A system for facilitating communication between dissimilar analog radio devices over a computer network, comprising:
   a first communications terminal comprising:
      at least a first analog radio device; and
      a first analog signal converting apparatus for converting an analog signal to a first digital signal;
   a second communications terminal comprising:
      at least a second analog radio device;
      a signal format converting apparatus for converting said first digital signal received from said first communications terminal into a second digital signal, said first and second digital signals associated with dissimilar analog radio devices; and
      a digital signal converting apparatus for converting said second digital signal into a second analog signal; and
   a computer network interface coupling said first communications terminal to said second communications terminal.

2. The system of claim 1, wherein said computer network is a token ring network, ethernet local area network, or wide area network.

3. The system of claim 1, wherein said computer network interface is a wireless interface.

4. A system for interfacing an analog radio device with a computer network, comprising:
   a first analog radio device; and
   a terminal coupled to said first analog radio device, said terminal further comprising:
      a memory having program instructions; and
      a processor configured to use the program instructions to convert a first analog signal into a first digital signal; to transmit said first digital signal to a computer network; to receive a second digital signal from said computer network, said second digital signal associated with a dissimilar second analog radio device from said analog radio device; to convert said second digital signal into a third digital signal, wherein said third digital signal is associated with said second analog radio device; to convert said third digital signal into a second analog signal; and to transmit said second analog signal to said first analog radio device.

5. The system of claim 4, wherein the program instructions used by the processor to receive the second digital signal are further comprised of the following instructions:

detecting a carrier detect signal from said first analog radio device; and receiving a second digital signal from said computer network.

6. The system of claim 4, wherein at least one of the program instructions used by the processor to transmit said second analog signal to said first analog radio device is further comprised of a program instruction for transmitting a push-to-talk signal to said first analog radio device.

7. A method of communicating between dissimilar analog radio devices, across a computer network, said method comprising the steps of:

converting a first analog signal received at a first communications terminal into a first digital signal;

transmitting said first digital signal to a second communications terminal;

converting said first digital signal into a second digital signal at said second communications terminal, said first digital signal and said second digital signal being associated with said dissimilar analog radio devices;

converting said second digital signal into a second analog signal at said second communications terminal; and routing said second analog signal to an analog radio device.

8. The method of claim 7, wherein said transmitting step is performed in accordance with the UDP protocol.

9. The method of claim 7, wherein said transmitting step is performed in accordance with the H323 protocol.

10. The method of claim 7, wherein the step of converting a first analog signal received at a first communications terminal into a first digital signal is further comprised of the step of storing said first digital signal in a memory location.

11. A system for communicating between dissimilar analog radio devices, across a computer network, comprising:

means for converting a first analog signal received at a first communications terminal into a first digital signal;

means for transmitting said first digital signal to a second communications terminal;

means for converting said first digital signal into a second digital signal at said second communications terminal, said first digital signal and said second digital signal being associated with said dissimilar analog radio devices;

means for converting said second digital signal into a second analog signal at said second communications terminal; and means for routing said second analog signal to an analog radio device.

* * * * *